United States Patent
Scurlock

(10) Patent No.: US 7,854,441 B2
(45) Date of Patent: Dec. 21, 2010

(54) BICYCLE DROP OUT

(75) Inventor: Frank Scurlock, Lakewood, CO (US)

(73) Assignee: The Gates Corporation, Denver, CO (US)

( * ) Notice: Subject to any disclaimer, the term of this patent is extended or adjusted under 35 U.S.C. 154(b) by 243 days.

(21) Appl. No.: 12/077,506

(22) Filed: Mar. 19, 2008

(65) Prior Publication Data

US 2009/0236819 A1 Sep. 24, 2009

(51) Int. Cl.
*B62M 1/02* (2006.01)

(52) U.S. Cl. .................. 280/261; 280/279; 280/288; 280/276; 280/281.1; 248/200

(58) Field of Classification Search ............. 280/261, 280/279, 288, 276, 281.1; 248/200
See application file for complete search history.

(56) References Cited

U.S. PATENT DOCUMENTS

| 1,262,786 | A | 4/1918 | Harley | |
|---|---|---|---|---|
| 4,565,383 | A | 1/1986 | Isaac | 280/276 |
| 4,909,529 | A | 3/1990 | Maguire | 280/261 |
| 5,025,977 | A | 6/1991 | Hartman | 228/171 |
| 5,082,303 | A | 1/1992 | Duehring et al. | 280/288 |
| 5,096,215 | A | 3/1992 | Chonan | 280/284 |
| 5,292,143 | A | 3/1994 | Stauch et al. | 280/279 |
| 6,554,307 | B1 * | 4/2003 | Ockenden | 280/204 |
| 2008/0272253 | A1 * | 11/2008 | Tseng | 248/200 |

OTHER PUBLICATIONS

Dirtrag, "Ground Up Custom Singlespeed"; Magazine pp. 56-57; Feb. 15, 2007; Issue 126; USA.

* cited by examiner

*Primary Examiner*—Lesley Morris
*Assistant Examiner*—Marlon A Arce
(74) *Attorney, Agent, or Firm*—J. A. Thurnau, Esq.; P. N. Dunlap, Esq.

(57) ABSTRACT

A bicycle drop out comprising a seat stay mount having a first receiving portion, a chain stay mount having a second receiving portion, a back plate releasably connected to the seat stay mount and the chain stay mount, the back plate comprising a first member for engaging the first receiving portion and a second member for engaging the second receiving portion, the back plate comprising a third slot for receiving an axle, the slot cooperatively disposed between the seat stay mount and the chain stay mount, and the seat stay mount and the chain stay mount having a gap therebetween for receiving a belt.

23 Claims, 6 Drawing Sheets

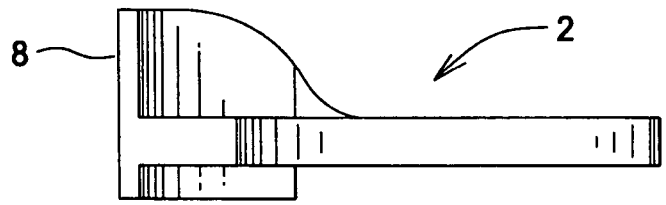
FIG.7
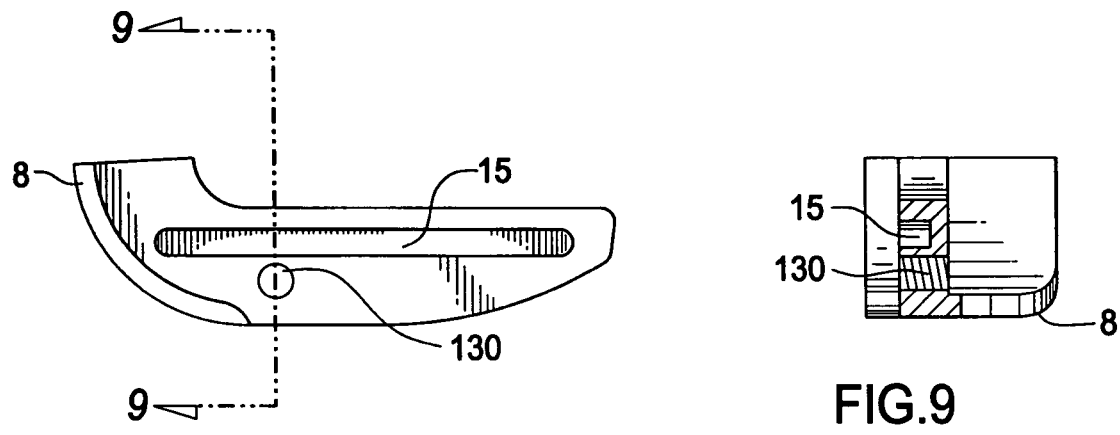
FIG.8
FIG.9
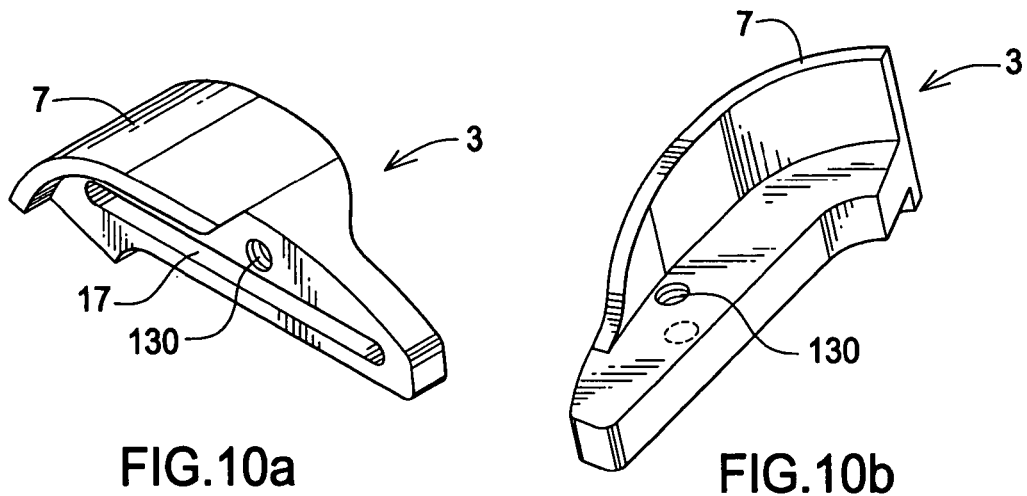
FIG.10a
FIG.10b

BICYCLE DROP OUT

FIELD OF THE INVENTION

The invention relates to a bicycle drop out, and more particularly, to a bicycle drop out for installation of a belt through a bicycle frame.

BACKGROUND OF THE INVENTION

Conventional bicycles are traditionally driven by a chain. The chain is connected between a forward sprocket and a rear sprocket. The forward sprocket is connected to the crank. The rider's feet engage the crank for propelling the bicycle forward.

Installation of the chain simply involves use of a master link. The master link allows the chain to be "broken" and reconnected. Consequently, there is no need to open a gap in the bicycle frame to allow the chain to pass though the frame since the chain can be opened using the master link.

Representative of the art is U.S. Pat. No. 4,909,529 which discloses a bicycle having a belt and pulleys in place of the usual chain and sprockets. Each pulley has three (more of less) raceways separated by discs (pulley walls). The discs (pulley walls) have openings that permit the belt to be shifted from one raceway to another raceway. A rotatable arm pivoted to the frame of the bicycle controls the shifting of the belt to the desired raceways. One end of the arm applies lateral pressure to the belt just before it arrives at the pulley associated with the driving pedals of the bicycle, to shift raceways for the driving pulley. Similarly the other end of the arm applies lateral pressure to the belt just before it enters the driven pulley to shift raceways of that pulley. Each end of the arm is biased by a main spring to apply vertical pressure to the belt to maintain it tight.

The ability to use flexible belts on bicycles is desirable since belts are more quiet, clean and efficient than chains. However, since belts are manufactured in a continuous loop which cannot be cut so it can be passed through a frame, it is then necessary to cut or open a gap in the frame itself though which the belt can pass. The gap must be closeable so that the structural integrity of the frame is fully restored for use. The gap must also be reliable and reusable so the belt can be replaced as desired. The frame components affected by this are the drop out, seat stay and the chain stay.

What is needed is a bicycle drop out for installation of a belt through a bicycle frame. The present invention meets this need.

SUMMARY OF THE INVENTION

The primary aspect of the invention is to provide a bicycle drop out for installation of a belt through a bicycle frame.

Other aspects of the invention will be pointed out or made obvious by the following description of the invention and the accompanying drawings.

The invention comprises a bicycle drop out comprising a seat stay mount having a first receiving portion, a chain stay mount having a second receiving portion, a back plate releasably connected to the seat stay mount and the chain stay mount, the back plate comprising a first member for engaging the first receiving portion and a second member for engaging the second receiving portion, the back plate comprising a third slot for receiving an axle, the slot cooperatively disposed between the seat stay mount and the chain stay mount, and the seat stay mount and the chain stay mount having a gap therebetween for receiving a belt.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 7 is a top view of the chain stay mount.
FIG. 8 is a side view of the chain stay mount.
FIG. 9 is a cross section though FIG. 8.
FIG. 10a is a perspective side view of the seat stay mount.
FIG. 10b is a perspective side view of the seat stay mount.

DETAILED DESCRIPTION OF THE PREFERRED EMBODIMENT

Figure 1:
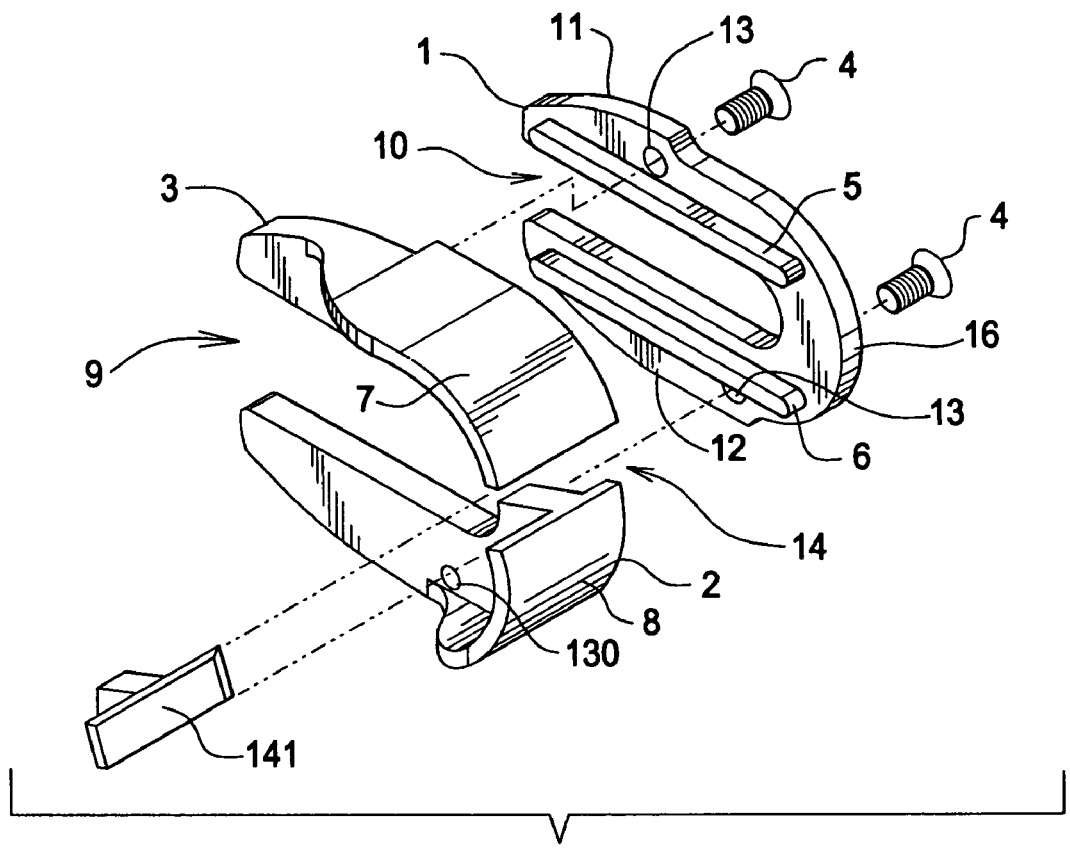
FIG. 1 is a perspective view of the drop out.

FIG. 1 is a perspective view of the drop out. The drop out comprises back plate 1, chain stay mount 2 and seat stay mount 3. Threaded fasteners 4 are use to connect the back plate to the seat stay mount and the chain stay mount. Fasteners may comprise screws or bolts, for example, FHCS, MX3.6, 6 mm length screws.

Back plate 1 further comprises reinforcing members 5 and 6. Members 5 and 6 protrude from back plate 1 and extend substantially parallel to each other along the length of each arm 11, 12 of back plate 1. A slot 10 receives an axle (not shown). Back plate 1 may also be used on the "front" of the seat stay mount and chain stay mount, hence, the term "back" is simply used for ease of reference and does not limit the position of plate 1.

Members 5 and 6 are adjacent to slot 10 in order to reinforce and hold back plate 1 in position with respect to seat stay mount 3 and chain stay mount 2. Although members 5 and 6 are shown as linear, each member 5 and 6 may have any form suitable for engaging the seat stay mount and chain stay mount, for example, having an arcuate shape or having portions radiating or extending from each member 5 and 6.

A frame seat stay (not shown) is fixedly connected using methods known in the art to flange 7. A frame chain stay (not shown) is fixedly connected using methods known in the art to flange 8. Connecting methods may include brazing, welding or bonding using adhesives known in the art. Fasteners 4 are engaged through holes 13.

A member 141 is engaged in the gap 14 between the seat stay mount and the chain stay mount to further reinforce the drop out.

Once installed on a bicycle frame, a gap 14 is disposed between the seat stay mount and the chain stay mount. A belt (not shown) is installed by being passed though gap 14, which in turn allows the belt to be passed though the frame (not shown). Namely, the seat stay mount and the chain stay mount are temporarily moveable so they can be spread part from each other in order to receive the belt therebetween.

In an alternate embodiment member 141 is omitted and the seat stay mount 3 and the chain stay mount 2 are in contact at the gap 14 where the member 141 would have been installed. The alternate dropout otherwise functions as described herein.

Figure 2:
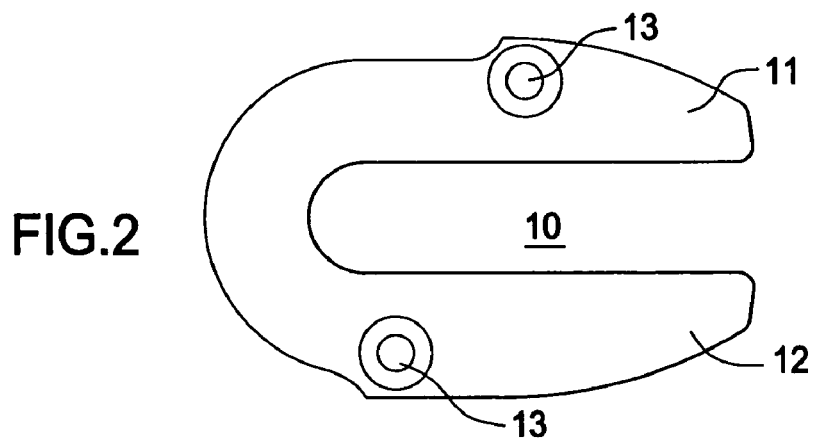
FIG. 2 is a side view of the back plate.

FIG. 2 is a side view of the back plate. Back plate 11 is substantially "U" shaped. A hole 13 is disposed in each arm 11, 12. Arms 11, 12 define slot 10. An axle (not shown) engages slot 10.

Figure 3:
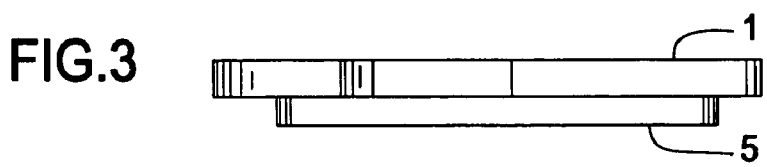
FIG. 3 is a top view of the back plate.

FIG. 3 is a top view of the back plate. Reinforcing member 5 extends from the body of back plate 1.

Figure 4:
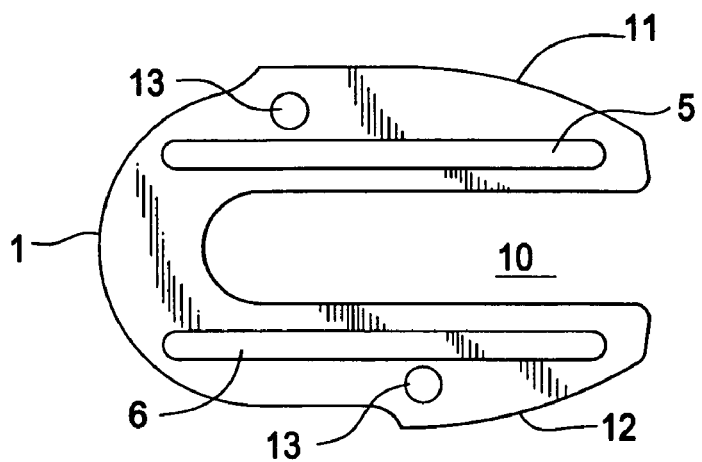
FIG. 4 is a side view of the back plate.

FIG. 4 is a side view of the back plate. Each reinforcing member 5, 6 extends along each arm 11, 12 respectively.

Figure 5A:
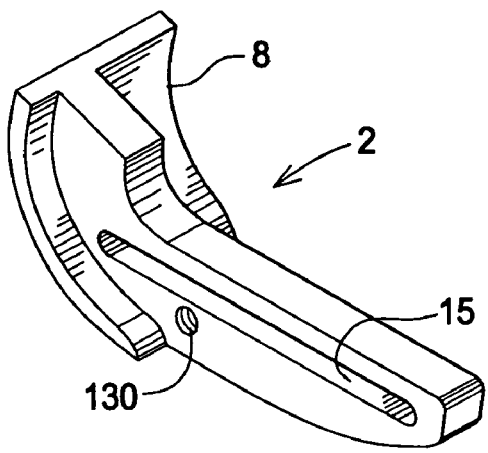
FIG. 5a is perspective side view of the chain stay mount.

FIG. 5a is perspective side view of the chain stay mount. Slot or receiving portion 15 receives reinforcing member 6. Flange 8 is arcuate to engage an outer surface 16 of back plate 1. The arcuate form of flange 8 also serves to further strengthen the chain stay mount. Fastener 4 engages a hole 130.

Figure 5B:
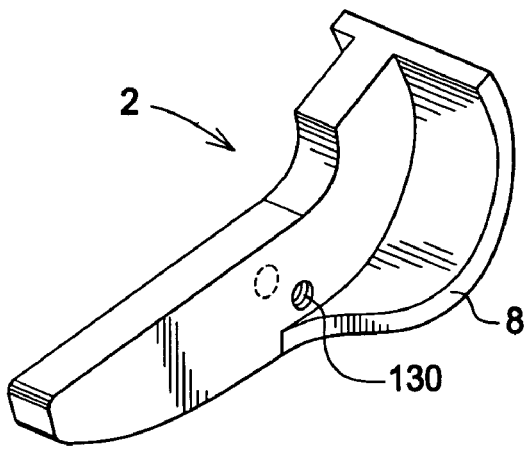
FIG. 5b is a perspective side view of the chain stay mount.

FIG. 5b is a perspective side view of the chain stay mount. In this embodiment slot 15 does not extend through the chain stay mount, however, it may also extend through the chain stay mount with full functionality. Fastener 4 engages a hole 130.

Figure 6:
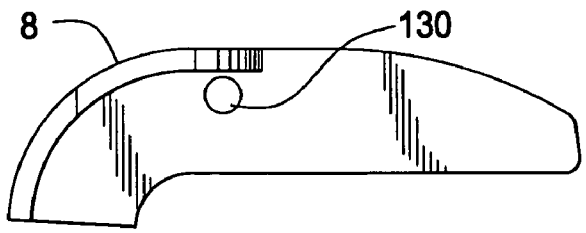
FIG. 6 is a side view of the chain stay mount.

FIG. 6 is a side view of the chain stay mount.

FIG. 7 is a top view of the chain stay mount. Flange 8 extends normally from the body of chain stay mount 2.

FIG. 8 is a side view of the chain stay mount. Member 6 engages slot 15. Engagement of member 6 in slot 15 prevents gap 14 from spreading during use of a bicycle. This is because high tensile preloads are required for proper operation of the belt, for example up to 200 pounds. High torques are also a feature of the bicycle belt drive, for example up to 500 ft-lbs. A high tensile load will tend to force open gap 14 due to the loads applied to the axle. Another source of loads are those caused by the bicycle and rear tire traveling over uneven or rough terrain, thereby causing shock loads to be transmitted through the wheel and axle to the dropout. By keying reinforcing members 5, 6 into slots 15 and 17 respectively, the seat stay mount and chain stay mount are locked into proper position under load. Typically, members 5 and 6 experience a shear load when engaged with slots 17 and 15 respectively.

In an alternate embodiment reinforcing members 5, 6 may comprise slots, and slots 15, 17 then comprise reinforcing members which cooperatively engage the slots.

FIG. 9 is a cross section though FIG. 8.

FIG. 10a is a perspective side view of the seat stay mount. Seat stay mount 3 comprises slot or receiving portion 17. Member 5 cooperatively engages slot 17. Flange 7 is arcuate to engage an outer surface 16 of back plate 1. The arcuate form of flange 7 also serves to further strengthen the seat stay mount. Fastener 4 engages a hole 130.

FIG. 10b is a perspective side view of the seat stay mount. Fastener 4 engages a hole 130.

Figure 11:
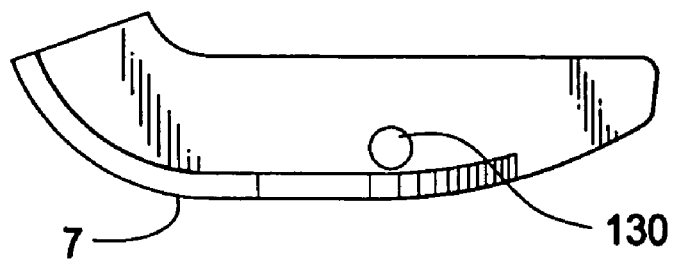
FIG. 11 is a side view of the seat stay mount.

FIG. 11 is a side view of the seat stay mount.

Figure 12:
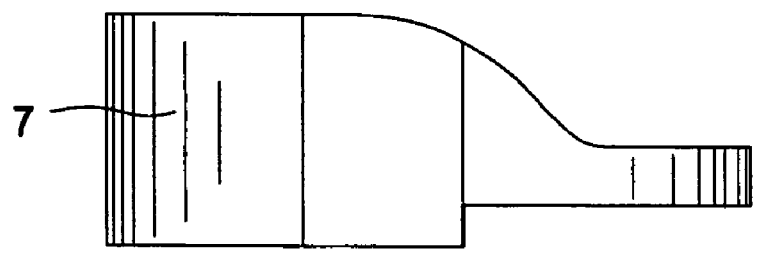
FIG. 12 is a top view of the seat stay mount.

FIG. 12 is a top view of the seat stay mount.

Figure 13:
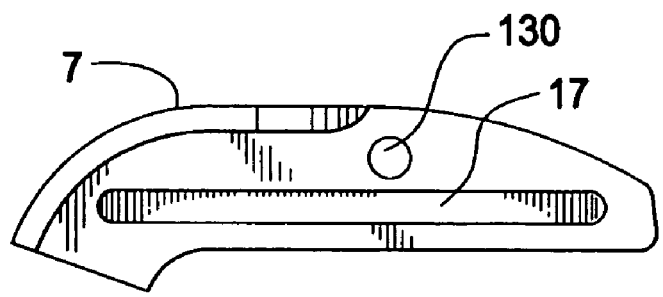
FIG. 13 is a side view of the seat stay mount.

FIG. 13 is a side view of the seat stay mount. Slot 17 extends substantially parallel to slot 10.

Figure 14:
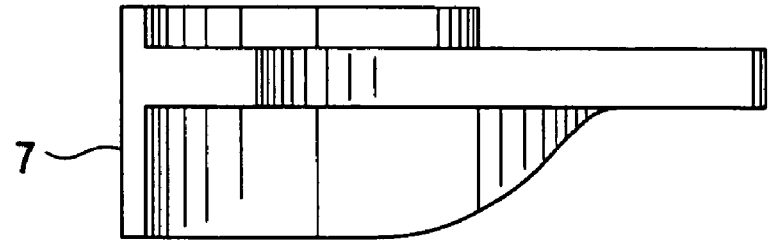
FIG. 14 is a bottom view of the seat stay mount.

FIG. 14 is a bottom view of the seat stay mount. Flange 7 extends normally from the body of seat stay mount 3.

Figure 15:
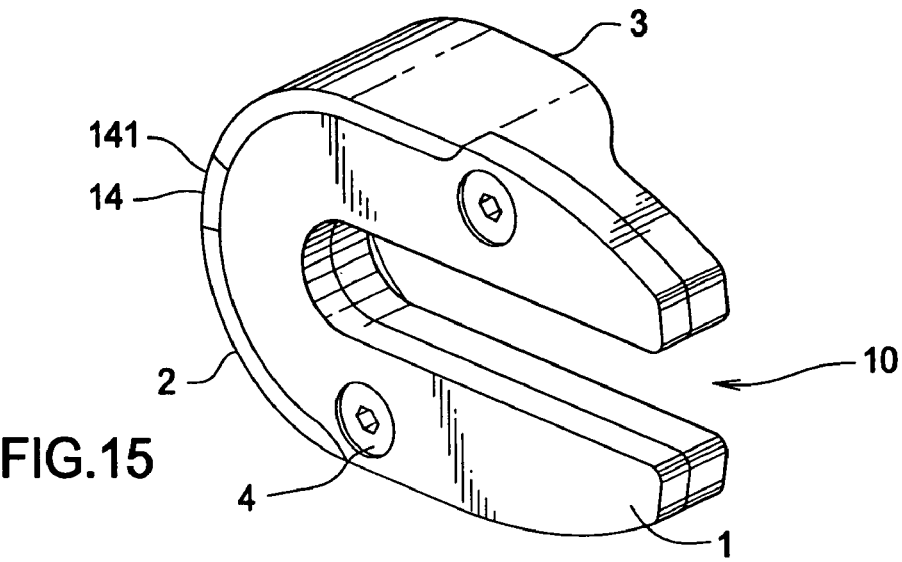
FIG. 15 is a perspective view of the drop out.

FIG. 15 is a perspective view of the drop out. The drop out is shown fully assembled. Back plate 1 is fastened to the seat stay mount 3 and the chain stay mount 2 using screws 4. Slot 10 receives an axle.

In an alternate embodiment member 141 is not present. Instead, flange 7 and flange 8 are in direct contact at the location of gap 14. Belt installation is accomplished by slightly separating the chain stay mount and seat stay mount by "springing" apart the seat stay 83 and chain stay 81 and then inserting the belt through the drop out, that is, through a temporary gap 14 which gap results from the separation of the seat stay mount and the chain stay mount. After the belt is installed the seat stay mount and chain stay mount spring back into contact, thereby closing gap 14. The back plate is then installed as otherwise described herein.

Figure 16:
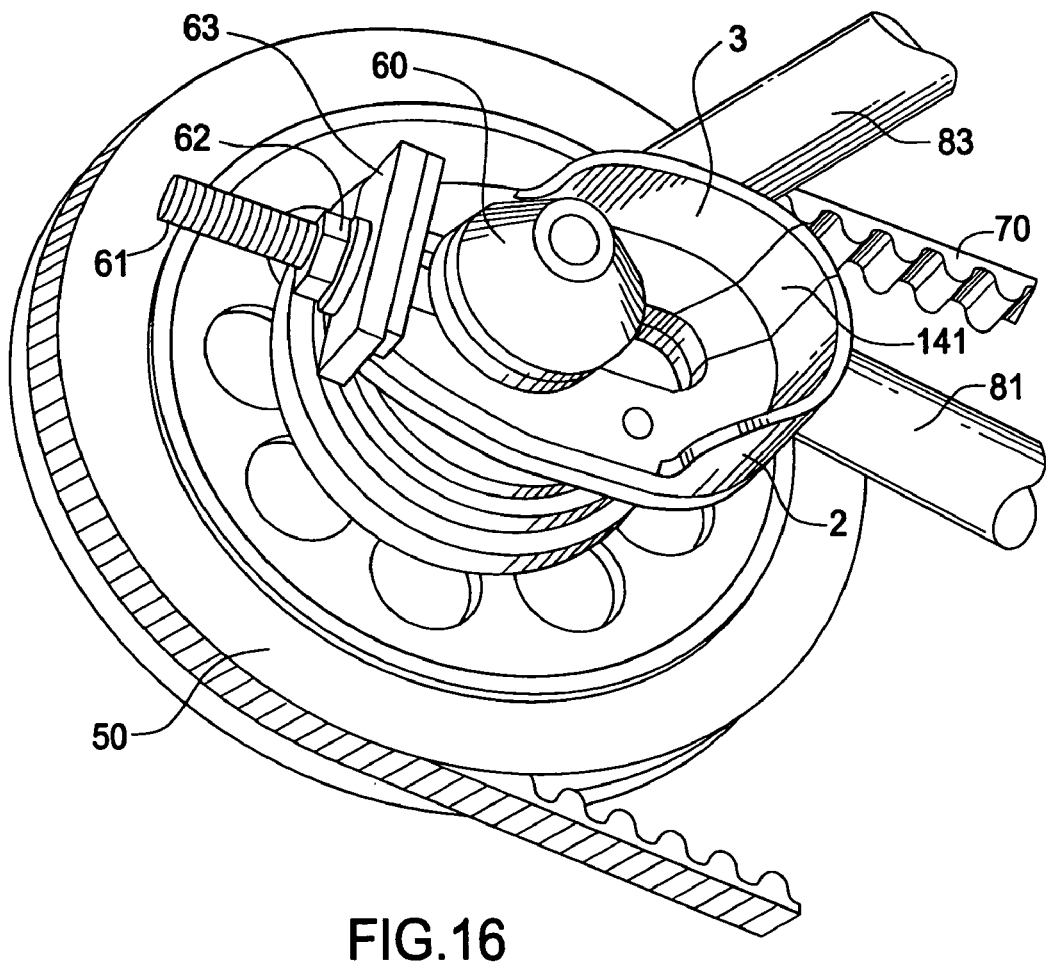
FIG. 16 is a view from below of a bicycle and the drop out in a frame.

FIG. 16 is a view from below of a bicycle and the drop out in a bicycle frame. Axle 60 is engaged to the drop out in slot 10. The open end of slot 10 is directed toward the rear of the bicycle frame, see also FIG. 18. This allows installation and adjustment of the axle and thereby the belt tension using axle adjuster 61. Sprocket 50 is connected to axle 60. Sprocket 50 engages a belt, see FIG. 16.

Axle adjuster 61 is used to adjust belt preload by fixing an axle position with respect to the drop out. Axle adjuster 61 is known in the art and typically comprises a treaded rod which is engaged with the axle 60. A rotatable nut 62 engages adjuster 61. Nut 62 bears upon a plate member 63, which member 63 is in contact with an end of drop out 10.

Figure 17:
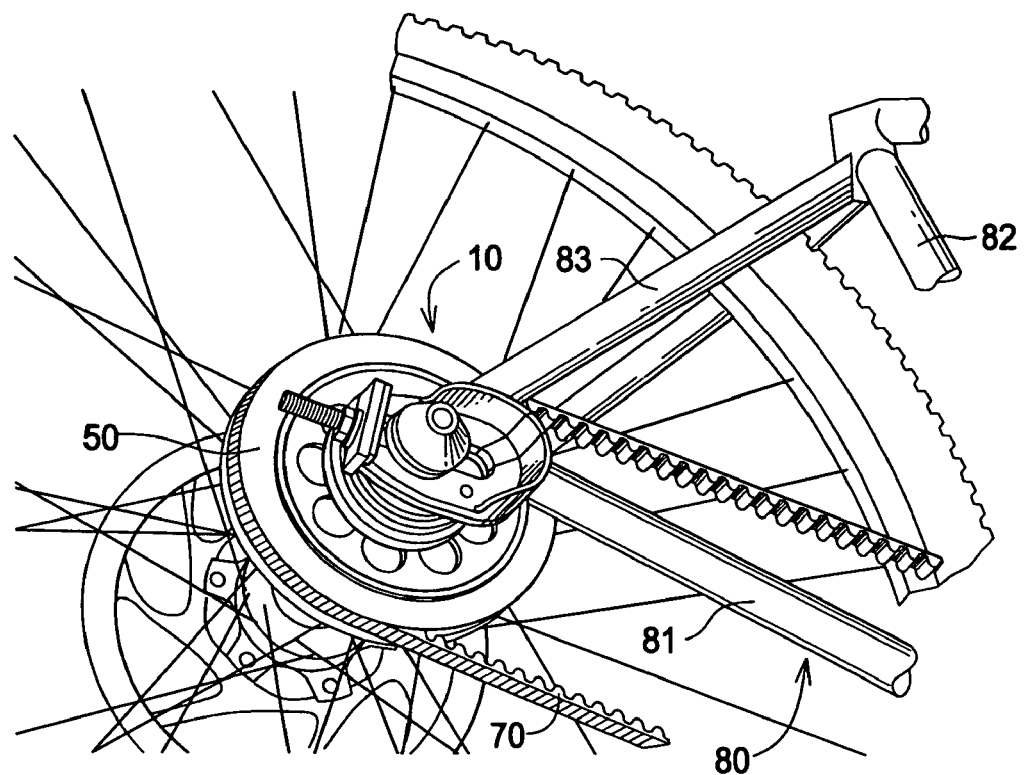
FIG. 17 is a view from below of a bicycle and the drop out in a frame.

FIG. 17 is a view from below of a bicycle and the drop out in a frame. Belt 70 is engaged with sprocket 50.

Figure 18:
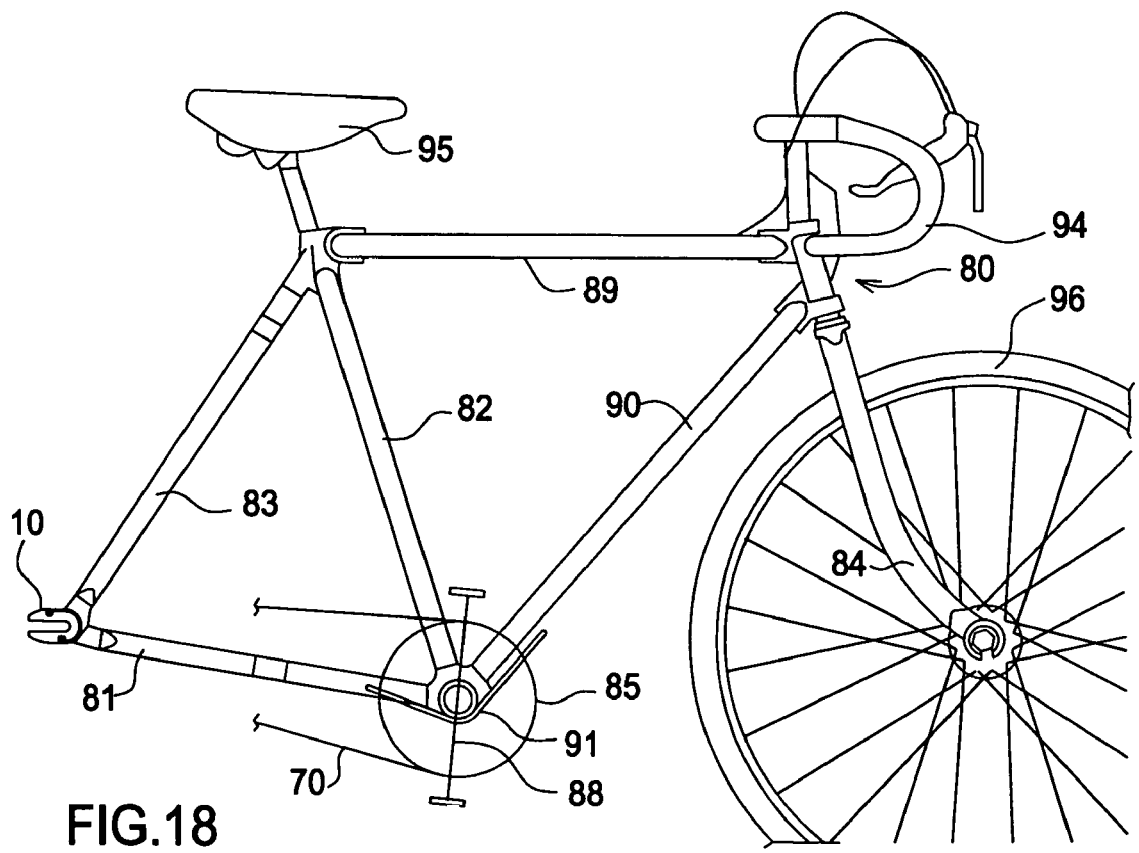
FIG. 18 is a side view of a bicycle frame.

FIG. 18 is a side view of a bicycle frame. Frame 80 is typically known in the art and comprises a front fork 84, a seat tube 82, a top tube 89, a down tube 90, a bottom bracket 91, a seat stay 83, a chain stay 81 and dropouts 10. Frame 80 when combined with a seat, handlebars, tires, brakes and various other known components comprises a bicycle. Drop out 10 is fixedly connected to the seat stay 38 and chain stay 81. A front sprocket 85 is connected to sprocket 50 by belt 70, see FIG. 17. Belt 70 comprises a toothed belt. Sprocket 85 is typically connected to a crank 88, known in the art. Sprocket 85, sprocket 50, belt 70 and drop put 10 comprise a belt drive module.

The frame may also further comprise a seat 95 installed on top of seat tube 82, handlebars 94 at the top of front fork 84 and a front wheel 96 installed on the lower end of front fork 84, all known in the art.

Although a form of the invention has been described herein, it will be obvious to those skilled in the art that variations may be made in the construction and relation of parts without departing from the spirit and scope of the invention described herein.

I claim:

1. A bicycle drop out comprising:
   a seat stay mount having a first receiving portion;
   a chain stay mount having a second receiving portion;
   a back plate releasably connected to the seat stay mount and the chain stay mount, the back plate comprising a first member for engaging the first receiving portion and a second member for engaging the second receiving portion;
   the back plate comprising a slot for receiving an axle, the slot cooperatively disposed between the seat stay mount and the chain stay mount; and
   the seat stay mount and the chain stay mount having a gap therebetween for receiving a belt.

2. The bicycle drop out as in claim 1, wherein the back plate is releasably connected to each of the seat stay mount and the chain stay mount using a threaded fastener.

3. The bicycle drop out as in claim 1, wherein the seat stay mount further comprises a flange extending normally to the back plate.

4. The bicycle drop out as claim 1, wherein the chain stay mount further comprises a flange extending normally to the back plate.

5. The bicycle drop out as in claim 1 further comprising a member engaged in the gap between the seat stay mount and the chain stay mount.

6. A bicycle comprising:
   a frame having a seat and a front fork;
   a belt drive comprising a first sprocket and a second sprocket;
   a belt engaged between the first sprocket and the second sprocket;
   the second sprocket connected to an axle;
   a drop out for receiving the axle, the drop out comprising;
      a seat stay mount mounted to the frame;
      a chain stay mount mounted to the frame;
      the seat stay mount and the chain stay mount are temporarily separable to receive the belt therebetween;
      a back plate releasably connected to the seat stay mount and the chain stay mount; and
      the back plate comprising a slot for receiving an axle, the slot cooperatively disposed between the seat stay mount and the chain stay mount.

7. The bicycle as in claim 6, wherein the back plate is releasably connected to each of the seat stay mount and the chain stay mount using a threaded fastener.

8. The bicycle as in claim 6, wherein the seat stay mount further comprises a flange extending normally to the back plate.

9. The bicycle as in claim 6, wherein the chain stay mount further comprises a flange extending normally to the back plate.

10. The bicycle as in claim 6, wherein:
    the seat stay mount having a first receiving portion;
    the chain stay mount having a second receiving portion; and
    the back plate comprising a first reinforcing member for engaging the first receiving portion and a second reinforcing member for engaging the second receiving portion.

11. A bicycle belt drive module comprising:
    a toothed belt entrained between a first sprocket and a second sprocket;
    the second sprocket drivingly engaged with an axle;
    a drop out for receiving the axle, the drop out comprising;
       a seat stay mount mountable to a seat stay;
       a chain stay mount mountable to a chain stay;
       a back plate releasably connected to the seat stay mount and the chain stay mount;
       the back plate comprising a slot for receiving the axle, the slot cooperatively disposed between the seat stay mount and the chain stay mount; and
       the seat stay mount and the chain stay mount having a gap therebetween for receiving the toothed belt.

12. The bicycle belt drive module as in claim 11, wherein the back plate is releasably connected to each of the seat stay mount and the chain stay mount using a threaded fastener.

13. The bicycle belt drive module as in claim 11, wherein the seat stay mount further comprises a flange extending normally to the back plate.

14. The bicycle belt drive module as in claim 11, wherein the chain stay mount further comprises a flange extending normally to the back plate.

15. The bicycle belt drive module as in claim 11 further comprising a member engaged in the gap between the seat stay mount and the chain stay mount.

16. The bicycle belt drive module as in claim 11, wherein:
    the seat stay mount having a first receiving portion;
    the chain stay mount having a second receiving portion; and
    the back plate comprising a first reinforcing member for engaging the first receiving portion and a second reinforcing member for engaging the second receiving portion.

17. A bicycle drop out comprising:
    a seat stay mount having a first receiving portion;
    a chain stay mount having a second receiving portion;
    the seat stay mount and the chain stay mount are temporarily separable to receive a belt therebetween;
    a back plate releasably connected to the seat stay mount and the chain stay mount, the back plate comprising a first member for engaging the first receiving portion and a second member for engaging the second receiving portion;
    the back plate comprising a third slot for receiving an axle, the slot cooperatively disposed between the seat stay mount and the chain stay mount.

18. The bicycle drop out as in claim 17, wherein the back plate is releasably connected to each of the seat stay mount and the chain stay mount using a threaded fastener.

19. The bicycle drop out as in claim 17, wherein the seat stay mount further comprises a flange extending normally to the back plate.

20. The bicycle drop out as claim 17, wherein the chain stay mount further comprises a flange extending normally to the back plate.

21. The bicycle as in claim 6 further comprising an axle adjuster.

22. A bicycle belt drive module comprising:
    a toothed belt entrained between a first sprocket and a second sprocket;
    the second sprocket drivingly engaged with an axle;
    a drop out for receiving the axle, the drop out comprising;
       a seat stay mount mountable to a seat stay;
       a chain stay mount mountable to a chain stay;
       a back plate releasably connected to the seat stay mount and the chain stay mount, the back plate comprising a slot for receiving the axle; and
       the seat stay mount and the chain stay mount having a gap therebetween for receiving the toothed belt.

23. The bicycle belt drive module as in claim 22 further comprising an axle adjuster engaged with the back plate.

* * * * *